US007420563B2

(12) United States Patent  
Wakabayashi

(10) Patent No.: US 7,420,563 B2  
(45) Date of Patent: Sep. 2, 2008

(54) ANALYSIS DATA MANAGEMENT SYSTEM AND PROGRAM THEREFOR

(75) Inventor: Kazuhito Wakabayashi, Kyoto-fu (JP)

(73) Assignee: Shimadzu Corporation, Kyoto (JP)

( * ) Notice: Subject to any disclaimer, the term of this patent is extended or adjusted under 35 U.S.C. 154(b) by 4 days.

(21) Appl. No.: 11/284,917

(22) Filed: Nov. 23, 2005

(65) Prior Publication Data

US 2006/0123349 A1 Jun. 8, 2006

(30) Foreign Application Priority Data

Nov. 29, 2004 (JP) ............................. 2004-343888

(51) Int. Cl.
*G06T 11/20* (2006.01)
(52) U.S. Cl. ................... 345/440.1; 345/440
(58) Field of Classification Search ............... 345/440.1
See application file for complete search history.

(56) References Cited

U.S. PATENT DOCUMENTS

| | | | | |
|---|---|---|---|---|
| 6,229,536 | B1 * | 5/2001 | Alexander et al. | 345/440.1 |
| 6,559,868 | B2 * | 5/2003 | Alexander et al. | 715/781 |
| 6,751,565 | B2 * | 6/2004 | Naroska et al. | 702/67 |
| 6,937,237 | B2 * | 8/2005 | McCarthy et al. | 345/440 |
| 7,199,796 | B2 * | 4/2007 | Bennett et al. | 345/440.1 |
| 2004/0150672 | A1 * | 8/2004 | Janko et al. | 345/804 |

FOREIGN PATENT DOCUMENTS

JP  2004-28864  1/2004

* cited by examiner

*Primary Examiner*—Motilewa Good-Johnson
(74) *Attorney, Agent, or Firm*—Westerman, Hattori, Daniels & Adrian, LLP.

(57) ABSTRACT

The present invention provides an analysis data management system with which users can efficiently check a number of analysis results obtained through a batch analysis or some other process. The system creates a list of waveform images each showing a chromatogram or spectrum representing each of the analysis results. This list facilitates the visual checking of whether there is any abnormal waveform. After checking each checkbox corresponding to each waveform image showing an abnormal waveform, the user performs a predetermined operation, in response to which the system creates a list of analysis setting data corresponding to the checked waveform images. After changing the setting data on the list according to necessity, the user commands the system to carry out the batch process again.

7 Claims, 2 Drawing Sheets

PERFORM ANALYSIS AGAIN
FOR CHECKED WAVEFORMS ONLY

ANALYSIS DATA MANAGEMENT SYSTEM AND PROGRAM THEREFOR

The present invention relates to a system and a program for managing analysis data obtained through an analysis of a sample using an analyzing apparatus such as a chromatograph, a mass spectrometer or a spectrophotometer.

BACKGROUND OF THE INVENTION

In a so-called batch analysis, plural samples are automatically analyzed under different conditions by a certain type of analyzing apparatus. This analysis requires a system for facilitating the management of analysis data because it yields the results of plural rounds of analysis for different samples or different analysis conditions at one time. An example of such a system is disclosed in the Japanese Unexamined Patent Publication No. 2004-28864.

After the entire sequence of the batch analysis has been finished, the operator should check whether the analysis has produced correct results for all the samples. This checking work conventionally includes the steps of exporting the resultant analysis data to a PDF (Portable Document Format) file, printing out waveform images of the chromatograms or spectra obtained, and visually checking the analysis results on a screen and the printout. If any analysis result is found to be abnormal, it is necessary to load the analysis result data and the analysis setting data corresponding to the abnormal result into the analysis application, change the analysis setting, and perform the analysis again.

The above-described conventional method is accompanied by the following problems:

The operator needs to load plural pieces of analysis result data corresponding to plural samples one by one into the application and display each piece of data on the screen or print it out for checking. Thus, the checking work is very inefficient.

Printing out the analysis result with a printer may encounter a paper jam, an out-of-paper or out-of-ink condition, or some other trouble, which will consume time and labor.

Since a printer is usually shared by plural users, documents printed out by different users often mix themselves on the tray, in which case someone needs to take the trouble to sort out the documents by users.

If any analysis result is found to be abnormal, it is necessary to search for a file containing the analysis data concerned to change the analysis setting and other parameters. This task inconveniences the operator to search a large number of files for the desired one.

To solve the above-listed problems, the present invention intends to provide an analysis data management system with which users can efficiently check a number of analysis results obtained through a batch analysis or some other process. The invention also intends to provide a program for operating a computer as the above-described system.

SUMMARY OF THE INVENTION

Thus, the analysis data management system according to the present invention includes:

a display unit capable of showing an image;

an analysis information storage unit for storing plural sets of analysis result data containing waveform data;

a waveform image creator for creating a waveform image from the waveform data contained in each set of the analysis result data; and a waveform list creator for creating a waveform image list showing waveform images corresponding to the analysis result data that satisfy a predetermined condition and for showing the waveform image list on the display unit.

The analysis data management program according to the present invention is characterized in that it operates a computer having a display unit as the above-described analysis data management system.

According to the present invention, the analysis result data containing waveform data are stored in the analysis information storage unit. The term "waveform data" hereby means any kinds of data that can be used to show a chromatogram, a spectrum or any other waveform in the form of an image. Examples of the waveform data are:

Bitmap data showing a reduced image (i.e. thumbnail) of a waveform graph that demonstrates an analysis result, and Vector data for drawing a waveform graph that demonstrates an analysis result. A set of vector data may contain either the coordinated data of all the measurement points or those of only a limited set of feature points necessary for roughly reproducing the waveform.

In addition to the waveform data mentioned above, the analysis information storage unit also stores various kinds of information relating to the analysis, such as the analysis date, the operator's name, the batch process identification number, the type of the sample used in the analysis and the raw data obtained through the analysis.

From the waveform data contained in each set of analysis result data, the waveform image creator produces a waveform image to be presented in the waveform image list to be mentioned later. It creates each waveform image every time the analysis of each sample is finished, or after the entire batch sequence is completed, and stores the image into the analysis information storage unit as a portion of the analysis result data. Alternatively, it may dynamically create a waveform image from the waveform data when the waveform image list is displayed.

The waveform list creator produces a waveform image list showing waveform images corresponding to the analysis result data that satisfy a predetermined condition, and shows the list on the display unit. The predetermined condition is defined by the operator name, the batch process identification number, the analysis date, the sample type and/or other items of information. In the process of creating the list, the waveform list creator chooses necessary waveform images from those which have been created beforehand by the waveform image creator and stored in the analysis information storage unit. Alternatively, the waveform image creator may dynamically create necessary images when the list is created.

In a preferable mode of the present invention, the analysis data management system further includes:

an analysis setting storage unit for storing analysis setting data of each analysis;

a waveform image selector for allowing a user to select one or more waveform images from those listed on the display unit; and an analysis setting changer for creating, on the display unit, a user interface for allowing the user to change the analysis setting data corresponding to the one or more waveform images selected.

In the present analysis data management system, if an analysis result is found to be abnormal, the user selects, on the display unit, the waveform image corresponding to that analysis result by, for example, checking a checkbox allocated to the waveform image concerned. Then, when the user performs a predetermined operation, the analysis setting changer loads the current analysis setting data and shows a graphical user interface (e.g. a window with input components), on which the user can change the analysis setting.

Thus, according to the present invention, the waveform image list showing waveform images of chromatograms or spectra of plural analysis results enables the user to quickly check whether there is any abnormal analysis result. Furthermore, the preferable mode of the present invention simplifies the work of changing the analysis setting and carrying out the analysis again when an abnormal analysis result is detected.

DETAILED DESCRIPTION OF A PREFERRED EMBODIMENT

Figure 1:
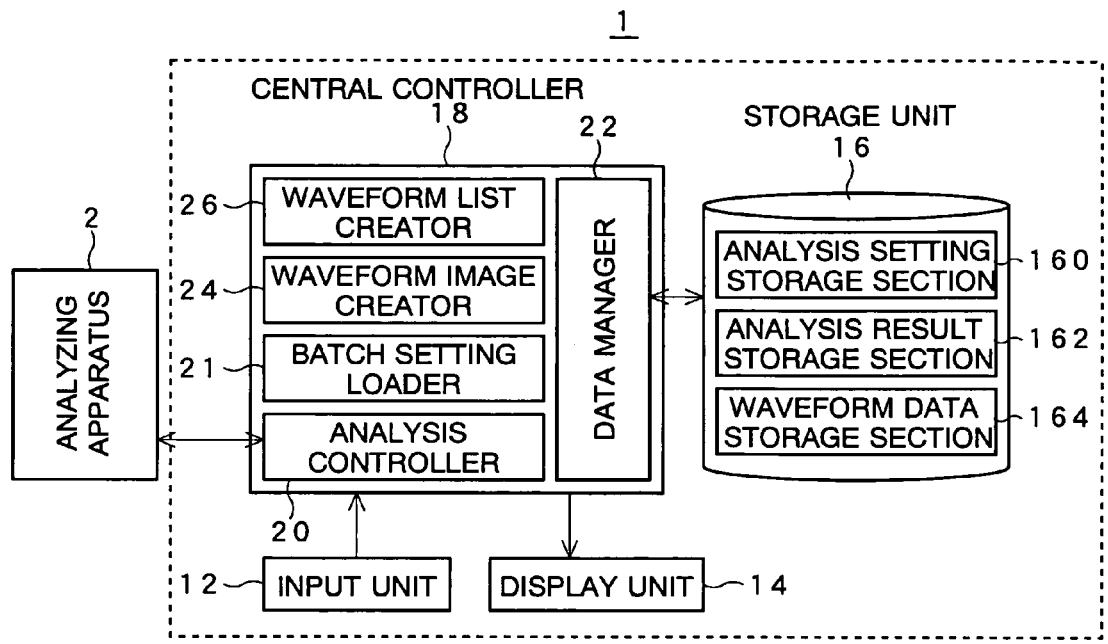
FIG. 1 schematically shows the construction of an embodiment of the analysis data management system according to the present invention.

FIG. 1 schematically shows the construction of an embodiment of the analysis data management system according to the present invention. This analysis data management system 1 (called the "present system 1" hereinafter) is constructed by a predetermined program running on a computer equipped with an input unit 12 (e.g. a keyboard or a mouse), a display unit 14 (e.g. a liquid crystal display (LCD) or a cathode ray tube (CRT)), a storage unit 16 (e.g. a hard disk), and a central controller 18 including a processor, a memory and other components. The storage unit 16 has an analysis setting storage section 160, an analysis result storage section 162 and a waveform data storage section 164.

The central controller 18 includes the following software components: analysis controller 20, batch setting loader 21, data manager 22, waveform image creator 24 and waveform list creator 26. These components are all constructed by the aforementioned program.

The following description shows the steps of performing a batch analysis using the present system 1. It is assumed that the analyzing apparatus 2 mentioned below is a chromatograph.

(Step S1)

Figure 2:
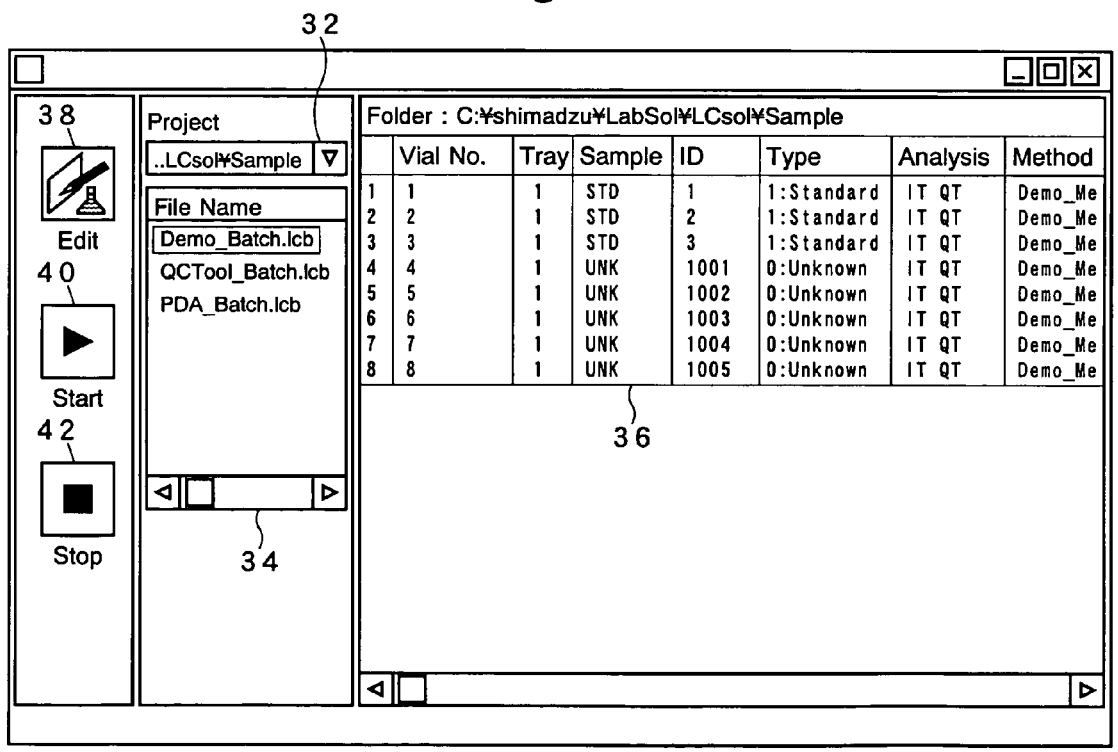
FIG. 2 shows a window of an analysis application.

First, the user executes a predetermined analysis application on the computer. FIG. 2 shows a window of the analysis application used in the present embodiment. This window includes the following components: drop down list 32, file list 34, analysis setting list 36, edit button 38, start button 40 and stop button 42. In this window, when the user selects a project with the drop down list 32, the file list 34 shows the batch setting files included in the project. Then, when the user selects one of the batch setting files on this file list 34, the batch setting loader 21 reads the content of the selected file and shows the setting data of each round of the batch analysis on the analysis setting list 36. In the present embodiment, the analysis setting data include the following items of information: vial number, tray number, sample name, sample ID, sample type, analysis type, data file, and method file name. The method file can be edited on an edit window (not shown), which appears when the edit button 38 is pressed.

(Step S2)

If the user presses the start button 40, the analysis controller 20 sends the chromatograph 2 an analysis-starting command accompanied by a set of analysis setting data prepared for the first round of the analysis. On receiving that command, the chromatograph 2 performs the analysis as specified by the setting data. If the stop button 42 is pressed during the analysis, the analysis controller 20 sends an analysis-stopping command to discontinue the analysis.

(Step S3)

During the analysis, the analysis controller 20 continuously receives output signals of the chromatograph 2 and extracts raw analysis data from the signals. The raw data is transferred to the data manager 22, which in turn stores the received data to the data file designated by the setting data.

(Step S4)

When one round of the analysis is finished, the data manager 22 stores the analysis date, the operator name, the sample name, the analysis setting file name and other related information into the analysis result storage section 162, associating them with the aforementioned data file. Meanwhile, the waveform image creator 24 produces a waveform image (e.g. a bitmap image) of the chromatogram from the raw analysis data. The waveform image thus produced is passed to the data manager 22, which in turn stores the image into the waveform data storage section 164, associating it with the aforementioned analysis result data.

(Step S5)

Subsequently, the analysis controller 20 checks whether the batch process has finished all rounds of the analysis. If one or more rounds remain unperformed, it sends the chromatograph 2 another analysis-starting command accompanied by a new set of analysis setting data prepared for the next round of the analysis. With the new set of data, Steps S3 and S4 are performed again as described above.

(Step S6)

When the batch process has finished all rounds of the analysis, the waveform list creator 26 produces a waveform image list and displays it on the screen of the display unit. An example of the waveform image list is shown in the upper section of FIG. 3. On this list, the user should visually check whether there is any abnormal waveform, for example, a waveform in which a peak or peaks that should appear is not shown. Absence of any abnormal waveform means the completion of the entire analysis, so that the user can print out the analysis result with a printer or perform any other operation using the obtained data according to necessity.

(Step S7)

Figure 3:
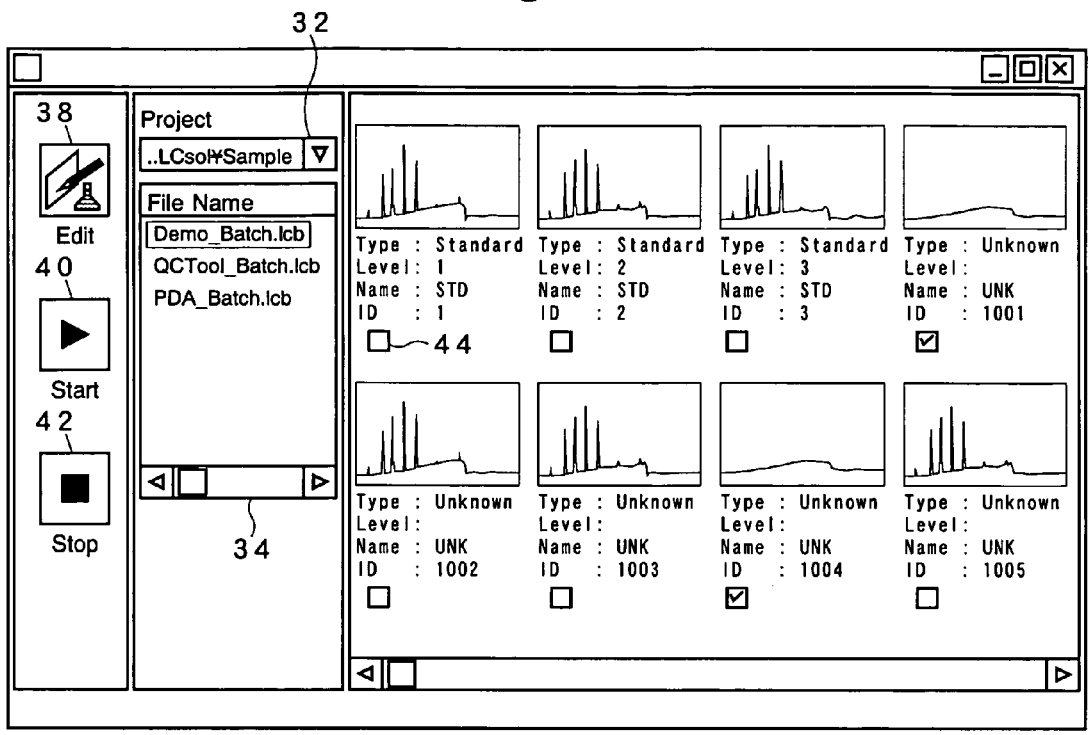
FIG. 3 shows, in the upper section, an example of the waveform image list and, in the lower section, a list of analysis setting data corresponding to the waveform images checked in the waveform image list.
Figure 3:
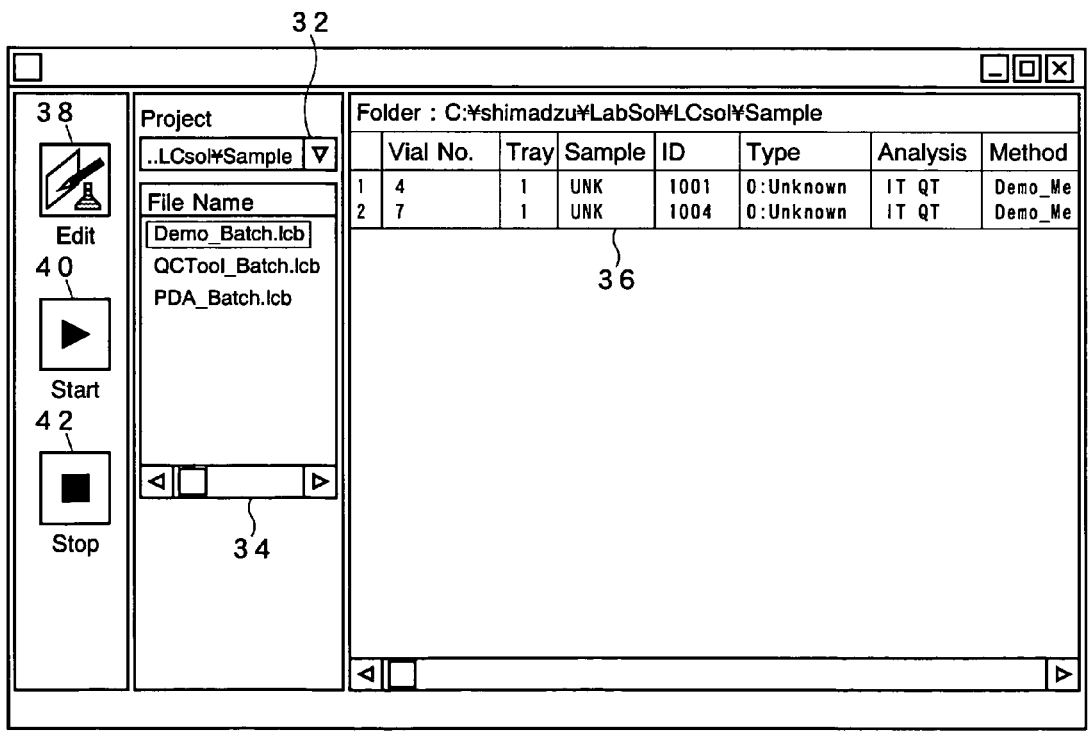

If one or more waveforms have been found to be abnormal in Step S6, the user checks each checkbox 44 corresponding to each abnormal waveform. In FIG. 3, two waveform images with sample IDs of 1001 and 1004, respectively, are checked. After the checking, the user presses an update button (not shown), in response to which the batch setting loader 21 reads the analysis setting data corresponding to the checked waveform images from the batch setting file and shows the data on the screen, as in the lower section of FIG. 3. After changing the analysis setting and/or the method on the screen, the user presses the start button 40, in response to which a new batch process is performed from Step S2 through Step S5 only for those rounds of analysis which yielded the abnormal waveform.

The embodiment of the analysis data management system described thus far is a mere example of the present invention. Examples of the modified versions follow:

(Modified Version 1)

The waveform image creator 24 may create a set of vector data for drawing a waveform and store it through the data manager 22 into the waveform data storage section 164 at the end of each round of the analysis, instead of creating a bitmap image and storing it into the waveform data storage section 164 as in the above-described embodiment. Alternatively, the waveform image creator 24 may directly create a waveform image from the raw analysis data if the computer is adequately powerful. This construction allows the waveform data storage section 164 to be omitted.

(Modified Version 2)

It is possible to add the function of defining a project by coordinating plural pieces of analysis result data obtained through plural separate analyses, and storing the project data into the analysis result storage section 160. This project data can be searched for analysis result data that satisfy a given condition relating to the operator name, the analysis date and so on, in addition to the batch analysis data containing plural sets of analysis result data obtained through a single batch process, and can be shown on the screen.

(Modified Version 3)

Instead of listing only the setting data corresponding to those rounds of analysis which have yielded an abnormal waveform as in the lower section of FIG. 3, it is possible to list the setting data of all rounds of the analysis performed in the batch process, as shown in FIG. 2, and then highlight only those lines which correspond to the abnormal analysis results.

It should be noted that the present invention can be embodied in different forms within the spirit and scope thereof.

What is claimed is:

1. An analysis data management system, comprising:
   a display unit capable of showing an image;
   an analysis information storage unit for storing plural sets of analysis result data containing waveform data;
   a waveform image creator for creating a waveform image from the waveform data contained in each set of the analysis result data;
   a waveform list creator for creating a waveform image list showing waveform images corresponding to the analysis result data that satisfy a predetermined condition and for showing the waveform image list on the display unit;
   an analysis setting storage unit for storing analysis setting data of each analysis;
   a waveform image selector for allowing a user to select one or more waveform images from those listed on the display unit; and
   an analysis setting changer for creating, on the display unit, a user interface for allowing the user to change the analysis setting data corresponding to the one or more waveform images selected.

2. The analysis data management system according to claim 1, wherein the waveform image created by the waveform image creator is made of bitmap data showing a reduced image of a waveform graph that demonstrates an analysis result.

3. The analysis data management system according to claim 1, wherein the waveform image created by the waveform image creator is made of vector data for drawing a waveform graph that demonstrates an analysis result.

4. The analysis data management system according to claim 1, wherein the waveform image creator produces the waveform image every time the analysis of each sample is finished and stores the image into the analysis information storage unit as a portion of the analysis result data.

5. The analysis data management system according to claim 1, wherein the waveform image creator produces the waveform image after the entire batch sequence is completed, and stores the image into the analysis information storage unit as a portion of the analysis result data.

6. The analysis data management system according to claim 1, wherein the waveform image creator dynamically creates the waveform image from the waveform data when the waveform image list is displayed.

7. A computer readable medium encoded with an analysis data management computer program for a computer having a display unit capable of showing an image as an analysis data management system, said analysis data management computer program when executed by said computer causes the computer to perform the steps of: storing plural sets of analysis result data containing waveform data; creating a waveform image from the waveform data contained in each set of the analysis result data; creating a waveform image list showing waveform images corresponding to the analysis result data that satisfy a predetermined condition; displaying the waveform image list on the display unit; storing analysis setting data of each analysis; allowing a user to select one or more waveform images from those listed on the display unit; and creating, on the display unit, a user interface for allowing the user to change, the analysis setting data corresponding to the one or more waveform images selected.

* * * * *